(12) United States Patent
Kung et al.

(10) Patent No.: US 8,130,763 B2
(45) Date of Patent: Mar. 6, 2012

(54) DATA ITEM INTERVAL IDENTIFIER LOOKUP METHOD AND SYSTEM

(75) Inventors: Ching-Fu Kung, Taipei (TW); Sheng-De Wang, Taipei (TW)

(73) Assignee: National Taiwan University, Taipei (TW)

( * ) Notice: Subject to any disclaimer, the term of this patent is extended or adjusted under 35 U.S.C. 154(b) by 194 days.

(21) Appl. No.: 12/142,592

(22) Filed: Jun. 19, 2008

(65) Prior Publication Data

US 2009/0190597 A1 Jul. 30, 2009

(30) Foreign Application Priority Data

Jan. 25, 2008 (TW) .............................. 97102787 A

(51) Int. Cl.
*H04L 12/28* (2006.01)
*H04L 12/56* (2006.01)
(52) U.S. Cl. .................. 370/395.32; 370/382; 370/392; 711/202; 711/205; 711/206; 711/208
(58) Field of Classification Search ............ 370/395.32, 370/392, 382; 707/3, 6, 100; 711/4, 5, 101, 711/170, 202, 205, 206, 208, 209, 220, 221
See application file for complete search history.

(56) References Cited

U.S. PATENT DOCUMENTS

| | | | | |
|---|---|---|---|---|
| 5,634,028 A * | 5/1997 | Brady et al. | ....................... | 711/4 |
| 6,434,144 B1 * | 8/2002 | Romanov | ..................... | 370/392 |
| 6,658,482 B1 * | 12/2003 | Chen et al. | ..................... | 709/245 |
| 6,691,218 B2 * | 2/2004 | Brown | ........................... | 711/216 |
| 6,775,737 B1 * | 8/2004 | Warkhede et al. | ............ | 711/108 |
| 6,963,924 B1 * | 11/2005 | Huang et al. | ................... | 709/238 |
| 7,031,314 B2 * | 4/2006 | Craig et al. | ..................... | 370/392 |
| 7,031,320 B2 * | 4/2006 | Choe | ........................ | 370/395.31 |
| 7,123,626 B1 * | 10/2006 | Feyerabend | ................... | 370/466 |
| 7,782,868 B2 * | 8/2010 | Hsieh et al. | ............. | 370/395.32 |
| 2002/0172203 A1 * | 11/2002 | Ji et al. | .......................... | 370/392 |
| 2006/0218126 A1 * | 9/2006 | De Ruijter et al. | ............... | 707/3 |
| 2009/0154461 A1 * | 6/2009 | Kitani et al. | .................... | 370/392 |
| 2009/0190597 A1 * | 7/2009 | Kung et al. | ............. | 370/395.32 |

* cited by examiner

*Primary Examiner* — Aung S Moe
*Assistant Examiner* — Benjamin H Elliott, IV

(57) ABSTRACT

A data item interval identifier lookup method and system is proposed, which is designed for integration to an information processing system for finding which predefined interval the value of an input data item, such as an IP (Internet Protocol) address, belongs. The proposed method and system is characterized by the use of a multi-stage lookup-table data structure having a number of cascaded lookup tables constructed by partitioning the data format of the input data item into a number of segments, each being mapped to one stage of lookup table data structure whose key-value relationships are predefined based on a predefined interval-and-identifier definition table. In operation, the values of the partitioned segments are sequentially used as lookup keys to search through the multi-stage lookup-table data structure until the corresponding interval identifier is found. This feature allows the implementation to have low memory requirement and enhanced system performance.

19 Claims, 4 Drawing Sheets

DATA ITEM INTERVAL IDENTIFIER LOOKUP METHOD AND SYSTEM

BACKGROUND OF THE INVENTION

1. Field of the Invention

This invention relates to computer network technology, and more particularly, to a data item interval identifier lookup method and system which is designed for integration to a data processing system (such as a computer unit, a network server, or a network system), for providing an interval identifier lookup function to an input data item (such as an IP address, a memory address, or a hard disk address), for finding where in a number of predefined intervals the value of the input data item belongs.

2. Description of Related Art

In the field of computer data processing, there exists a need for techniques that can process a fixed-length numerical data item, such as an IP address, a memory address, or a hard disk address, in such a manner as to find where in a number of predefined intervals the value of the input data item belongs. This allows different actions to be performed on the input data item based on its fitted interval.

In the field of computer networking, packet classification is an important mechanism that is used to determine the type of each packet that is being received and transmitted over a network system, such as the Internet, so that different operations can be performed for different types of packets. For example, the entire value range of the packet's destination IP address format can be divided into a number of intervals, with each interval being assigned to a unique identifier and corresponding to a different packet handling method. This allows a packet to be classified based on which interval the value of its destination IP address belongs.

Presently, the aforementioned interval identifier lookup function for IP addresses can be implemented with a one-stage lookup table, which maps the entire IP address value range to predefined intervals (each interval being represented by a numerical identifier), so that the value of an input IP address is directly used as an index for retrieving the corresponding interval identifier from the lookup table. One drawback to this conventional method, however, is that the one-stage lookup table requires the use of a memory space for storage that is exponentially proportional to the entire value range of the IP address; i.e., if the IP address has a length of L bits, then the required memory space for storing the lookup table is proportional to $2^L$. For example, in the case of IPv4 compliant IP address format which has a length of 32 bits, the total data amount for implementing the lookup table is proportional to $2^{32}$. In the case of IPv6 compliant IP address format which has a length of 128 bits, the total data amount is proportional to $2^{128}$. As a result, the one-stage lookup table method would require a huge amount of memory space for implementation. This drawback causes the implementation of packet classification to have low system performance.

In view of the above-mentioned drawbacks of the prior art, it is a research effort in the information technology industry for a new and improved IP address interval identifier lookup technique which can be implemented with low memory requirement and high system performance.

SUMMARY OF THE INVENTION

It is therefore an objective of this invention to provide a data item interval identifier lookup method and system which can be implemented with low memory requirement and high system performance.

The data item interval identifier lookup method and system according to the invention is designed for integration to a data processing system (such as a computer unit, a network server, or a network system), for providing an interval identifier lookup function to an input data item (such as an IP address, a memory address, or a hard disk address), for finding a corresponding interval identifier for the input data item, i.e., where in a number of predefined intervals the value of the input data item belongs.

In architecture, the data item interval identifier lookup system according to the invention comprises: (A) a multi-stage lookup table module; (B) a data item segmented value reading module; and (C) an inquiry module.

The data item interval identifier lookup method and system according to the invention is characterized by the use of a multi-stage lookup-table data structure having a number of cascaded lookup tables constructed by partitioning the data format of the input data item into a number of segments, each being mapped to one stage of lookup table data structure whose key-value relationships are predefined based on a predefined interval-and-identifier definition table. In operation, the values of the partitioned segments are sequentially used as lookup keys to search through the multi-stage lookup-table data structure until the corresponding interval identifier is found. This feature allows the implementation to have low memory requirement and enhanced system performance.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The data item interval identifier lookup method and system according to the invention is disclosed in full details by way of preferred embodiments in the following with reference to the accompanying drawings.

Application and Function of the Invention

Figure 1:
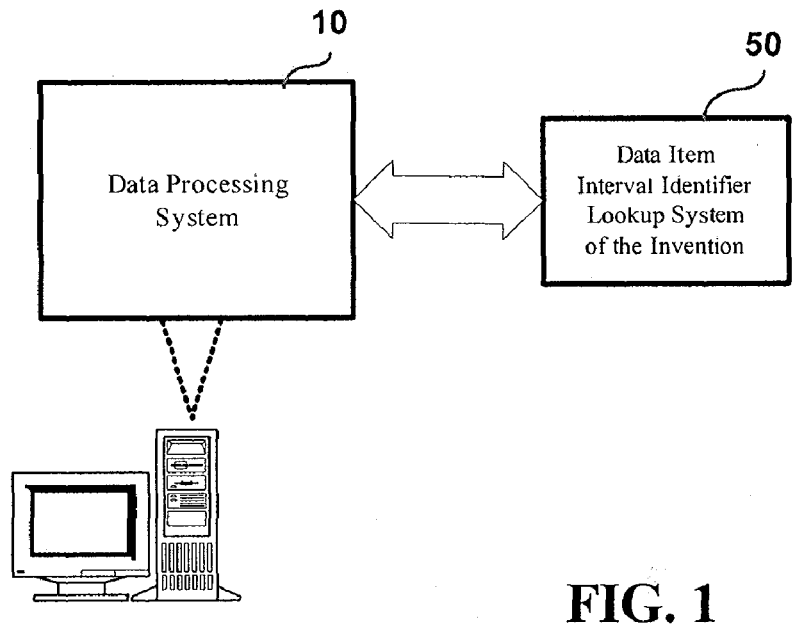
FIG. 1 is a schematic diagram showing the application of the data item interval identifier lookup system of the invention.

FIG. 1 is a schematic diagram showing the application of data item interval identifier lookup system according to the invention (which is here encapsulated in a box indicated by the reference numeral 50). As shown, the data item interval identifier lookup system of the invention 50 is designed for integration to a data processing system 10, such as a computer unit, a network server, or a network system (such as routers, hubs, firewalls, etc.), for providing the data processing system 10 with a data item interval identifier lookup function.

Examples of the input data item include, but not limited to, IP (Internet Protocol) addresses, memory addresses, and hard disk addresses.

In the following preferred embodiment, the data item interval identifier lookup system of the invention 50 is used for integration to a packet classification/filtering mechanism on a network system that handles IP address of 32 bits in length for the purpose of finding a corresponding interval identifier for each IP address, i.e., where in a number of predefined intervals the value of the IP address belongs.

Figure 2:
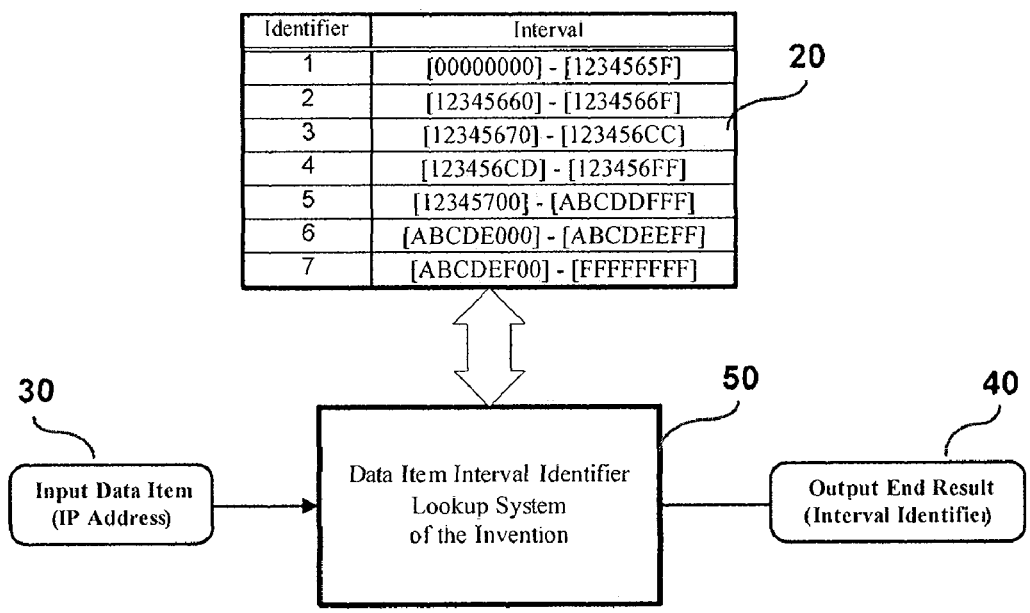
FIG. 2 is a schematic diagram showing the I/O functional model of the data item interval identifier lookup system of the invention.

FIG. 2 is a schematic diagram showing the input/output (I/O) functional model of the data item interval identifier lookup system of the invention 50. As shown, the data item interval identifier lookup system of the invention 50 operates with a user-predefined interval-and-identifier definition table 20 which partitions the entire value range of a 32-bit IP address format into a number of consecutive intervals, with each interval being assigned to a unique identifier. In the example of FIG. 2, the interval-and-identifier definition table 20 is predefined by partitioning the entire value range of the 32-bit IP address format into 7 consecutive intervals which are respectively assigned to a series of integer numbers 1-7 used as interval identifiers. For example, as shown in FIG. 2, the interval [0000 0000]-[1234565F] is assigned to the identifier [1]; the interval [1234 5660]-[1234 566F] is assigned to the identifier [2]; the interval [1234 5670]-[1234 56CC] is assigned to the identifier [3]; and so forth.

In the example of FIG. 2, assume the input data item to be handled is an IP address 30 whose value is [1234 8888], then the data item interval identifier lookup system of the invention 50 will be responsible for finding that its corresponding interval identifier is [5], and outputting the interval identifier [5] as the end result 40.

Architecture of the Invention

Figure 3:
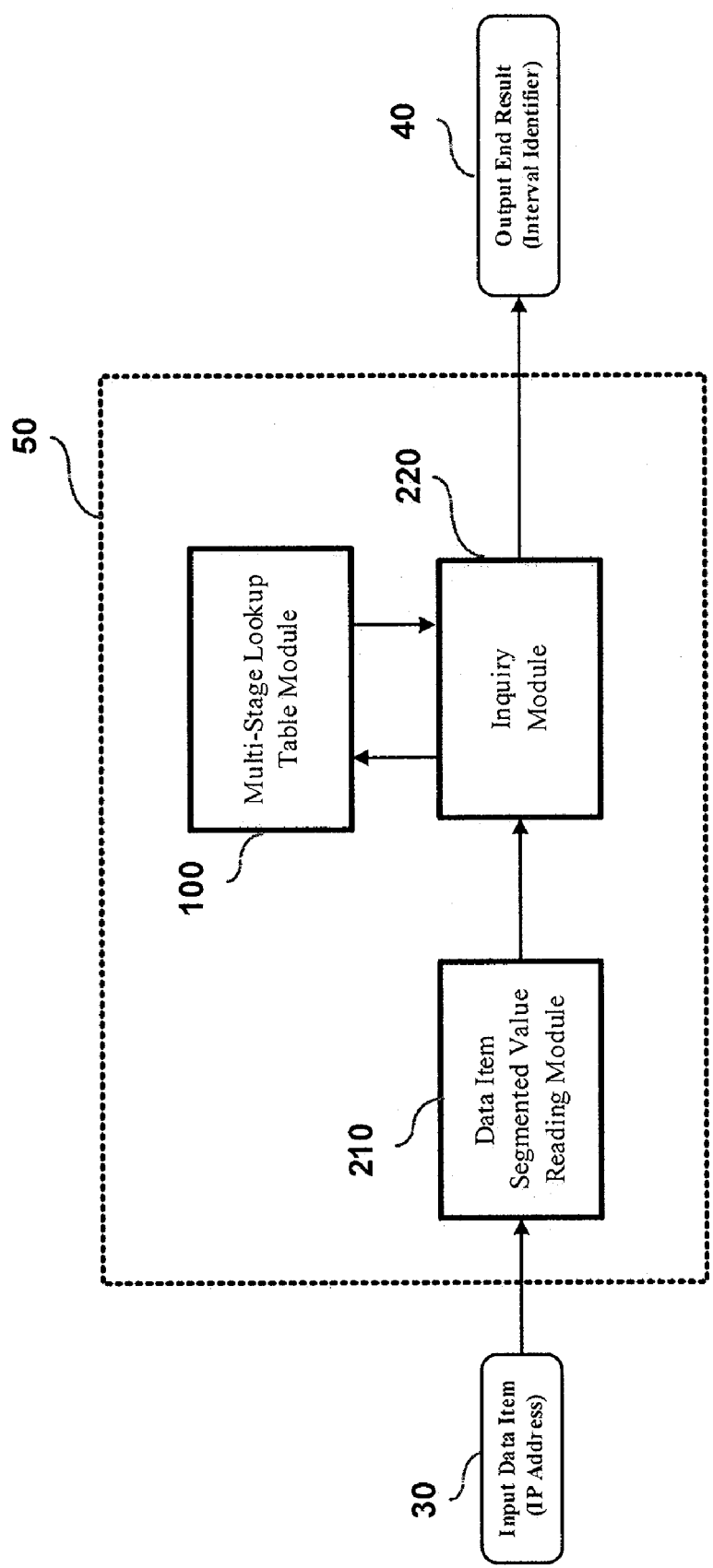
FIG. 3 is a schematic diagram showing the architecture of the data item interval identifier lookup system of the invention.

As shown in FIG. 3, in architecture, the data item interval identifier lookup system of the invention 50 comprises: (A) a multi-stage lookup table module 100; (B) a data item segmented value reading module 210; and (C) an inquiry module 220. Firstly, the respective attributes and behaviors of these constituent components of the data item interval identifier lookup system of the invention 50 are described in details in the following.

Multi-stage Lookup Table Module 100

The multi-stage lookup table module 100 is a static data-only module which is predefined by firstly partitioning the IP address format into a number of segments, and secondly establishing a number of segment-mapping lookup tables corresponding to the partitioned segments of the IP address format based on the set values in the interval-and-identifier definition table 20.

In practice, this multi-stage lookup table module 100 can be implemented in two different embodiments, as respectively disclosed in the following.

Figure 4A:
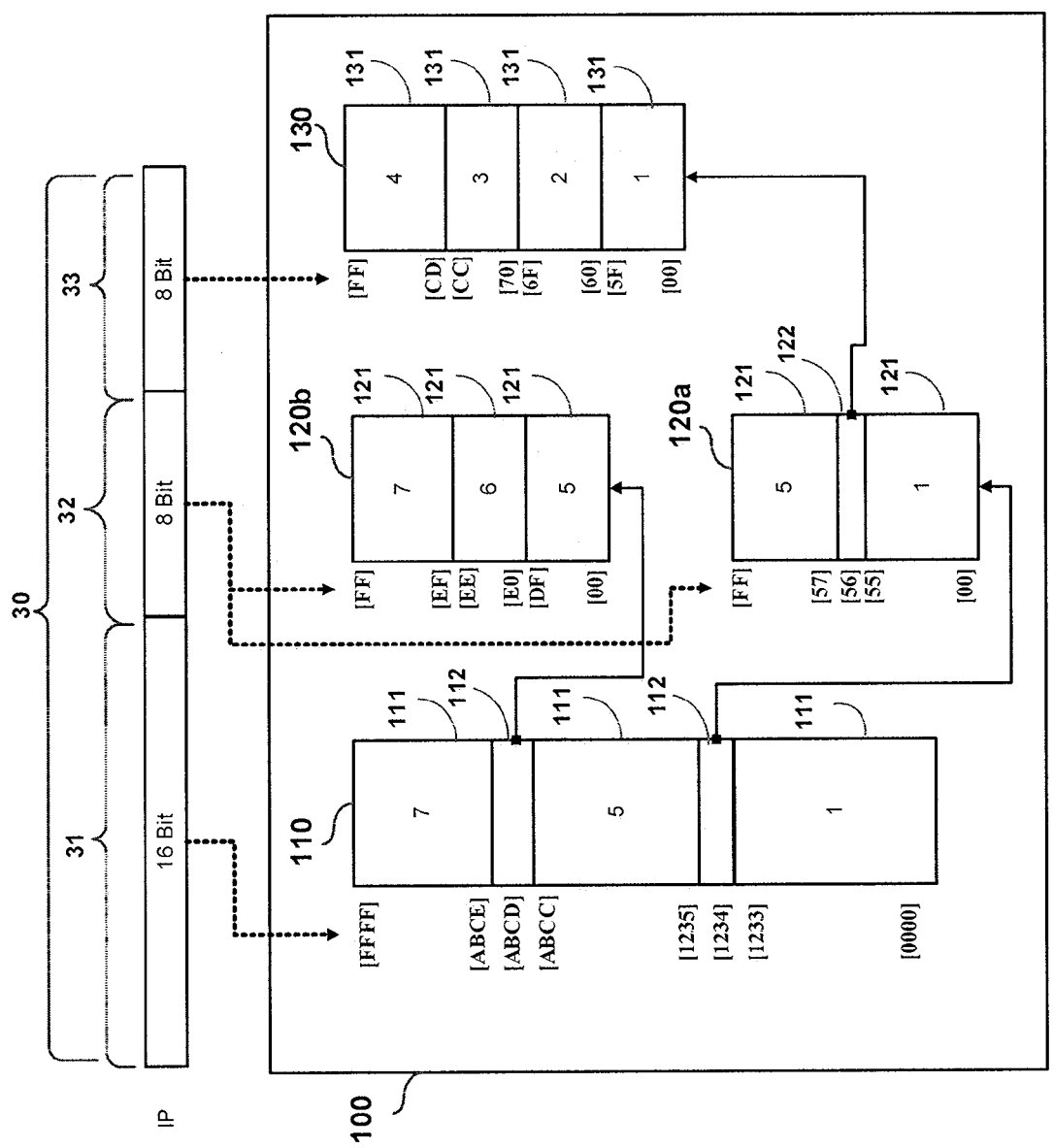
FIG. 4A is a schematic diagram showing the data structure of a first embodiment of the multi-stage lookup table module utilized by the invention.

First Embodiment of the Multi-stage Lookup Table Module 100 (FIG. 4A)

In the embodiment of FIG. 4A, the 32-bit IP address format is partitioned into, for example, 3 segments: a 16-bit prefix segment 31, an 8-bit middle segment 32, and an 8-bit postfix segment 33. It should be noted that the partition of the IP address data format is not limited to 3 segments, and can be 2, 4, 5, or more. Fundamentally, a larger number of segments would result in the use of a smaller memory space for storage, but a larger degree of complexity in design.

The next task is to build 3 stages of lookup table data structures corresponding to the 3 segments of the IP address format based on the set values in the interval-and-identifier definition table 20. In the example of FIG. 4A, the first-stage lookup table data structure including just one lookup table 110 (hereunder referred to as "first-stage lookup table") corresponding to the 16-bit prefix segment 31; the second-stage lookup table data structure including two lookup tables 120a, 120b (hereunder respectively referred to as "second-stage first-level lookup table" and "second-stage second-level lookup table") corresponding to the 8-bit middle segment 32; and the third-stage lookup table data structure includes just one lookup table 130 (hereunder referred to as "third-stage lookup table") corresponding to the 8-bit postfix segment 33. The mapping relations in these lookup tables 110, 120a, 120b, 130 are predefined based on the set values in the interval-and-identifier definition table 20 in reference to the values of the partitioned 3 segments 31, 32, 33 of the IP address format, as described in details in the following.

Based on the set values in the interval-and-identifier definition table 20 shown in FIG. 2, it can be seen that if the 16-bit prefix segment 31 of the IP address 30 has a value within the range [0000]-[1233], its corresponding interval identifier is [1] and therefore, in the first-stage lookup table 110, this value range [0000]-[1233] is set to be corresponding to the interval identifier [1]. If the 16-bit prefix segment 31 has a value equal to [1234], its corresponding interval identifier is in the range [1]-[5] and therefore, this value [1234] is set to be corresponding to a link to the second-stage first-level lookup table 120a. If the 16-bit prefix segment 31 has a value within the range [1235]-[ABCC], its corresponding interval identifier is [5]. If the 16-bit prefix segment 31 has a value equal to [ABCD], its corresponding interval identifier is in the range [5]-[7] and therefore, this value [ABCD] is set to be corresponding to a link to the second-stage second-level lookup table 120b. If the 16-bit prefix segment 31 has a value within the range [ABCE]-[FFFF], its corresponding interval identifier is [7]. In the first-stage lookup table 110 shown FIG. 4A, the reference numeral 111 indicates a mapped item representing an interval identifier and is hereunder referred to as "interval identifier specifier", while the reference numeral 112 indicates a mapped item representing a link to a next-stage lookup table and is hereunder referred to as "link specifier".

For the second-stage first-level lookup table 120a, if the 8-bit middle segment 32 of the IP address 30 has a value within the range [00]-[55], its corresponding interval identifier is [1]. If the 8-bit middle segment 32 has a value equal to [56], its corresponding interval identifier is in the range [1]-[4] and therefore, in the second-stage first-level lookup table 120a, this value [56] is set to be corresponding to a link to the third-stage lookup table 130. If the 8-bit middle segment 32 has a value within the range [57]-[FF], its corresponding interval identifier is [5]. Further, for the second-stage second-level lookup table 120b, if the 8-bit middle segment 32 of the IP address 30 has a value within the range [00]-[DF], its corresponding interval identifier is [5]. If the 8-bit middle segment 32 has a value within the range [E0]-[EE], its corresponding interval identifier is [6]. If the 8-bit middle segment 32 has a value within the range [EF]-[FF], its corresponding interval identifier is [7]. In the second-stage first-level lookup table 120a and second-stage second-level lookup table 120b shown FIG. 4A, the reference numeral 121 indicates a interval identifier specifier, while the reference numeral 122 indicates a link specifier which specifies a link to a next stage lookup table (i.e., the third-stage lookup table 130).

For the third-stage lookup table 130, if the 8-bit postfix segment 33 of the IP address 30 has a value within the range [00]-[5F], its corresponding interval identifier is [1]; if within the range [60]-[6F], its corresponding interval identifier is

[2]; if within the range [70]-[CC], its corresponding interval identifier is [3]; and if within the range [CD]-[FF], its corresponding interval identifier is [4]. In the third-stage lookup table 130 shown FIG. 4A, the reference numeral 131 indicates an interval identifier specifier which specifies a unique interval identifier.

Figure 4B:
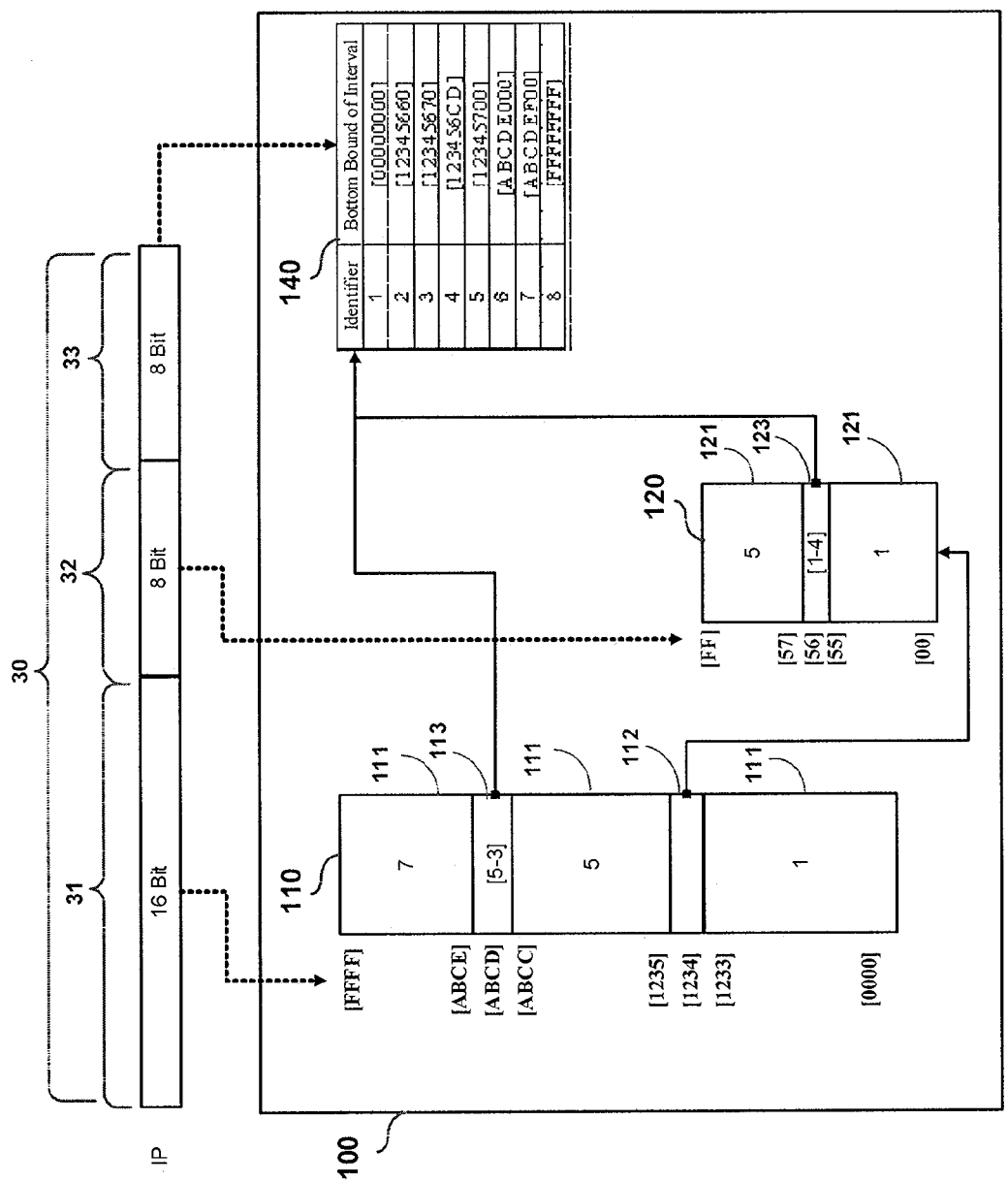
FIG. 4B is a schematic diagram showing the data structure of a second embodiment of the multi-stage lookup table module utilized by the invention.

Second Embodiment of the Multi-stage Lookup Table Module 100 (FIG. 4B)

As shown in FIG. 4B, the second embodiment differs from the previous first embodiment shown in FIG. 4A particularly in the case that if the 16-bit prefix segment 31 of the IP address 30 has a value equal to [ABCD] whose corresponding interval identifier is in a consecutive range [5]-[7], i.e., the corresponding interval identifier is [5], or [6], or [7]. Since this range [5]-[7] is consecutive from [5] to [7], its mapping can be set to an identifier-range and link specifier 113, which is used to specify two things: the corresponding identifier range, i.e., [5]-[7], and a link to an interval identifier lookup table 140. In practice, the identifier-range and link specifier 113 can be implemented in 3 different ways to specify the corresponding identifier range [5]-[7]: (1) [5-7], which shows the bottom bound and upper bound of the identifier range; (2) [5-3], which shows the bottom bound of the identifier range and the total number of interval identifiers within this range counting forward from the bottom bound; (3) [7-3], which shows the upper bound of the identifier range and the total number of interval identifiers within this range counting backward from the upper bound.

As shown in FIG. 4B, different from the interval-and-identifier definition table 20, the interval identifier lookup table 140 needs just to specify the starting value of each of the predefined intervals. For example, the first interval identifier [1] corresponds to the interval [0000 0000]-[1234 565F]; but in the interval identifier lookup table 140, it is suffice to set just the starting value [0000 0000] of this interval. The second interval identifier [2] corresponds to the interval [1234 5660]-[1234 566F]; but in the interval identifier lookup table 140, it suffice to set just the starting value [1234 5660]; and so forth. However, it should be noted that the interval identifier lookup table 140 needs to include an eighth row corresponding to the uppermost ending value [FFFF FFFF]. The inquiry to this interval identifier lookup table 140 can be implemented with a binary search method or other equivalent search method.

In a similar manner for the second-stage first-level lookup table 120a, if the 8-bit middle segment 32 of the IP address 30 has the value [56], its corresponding interval identifier is in the range [1]-[4], and is therefore mapped to an identifier-range and link specifier 123, which is used to specify the corresponding identifier range, i.e., [1]-[4], and a link to the interval identifier lookup table 140. In the example of FIG. 4B, the identifier range [1]-[4] is specified as [1-4], wherein [1] represents the bottom bound of the identifier range, and [4] represents the total number of interval identifiers within this range counting forward from the bottom bound.

In application, the second embodiment of the multi-stage lookup table module 100 is more advantageous to use than the first embodiment in that the second-stage second-level lookup table 120b used in the first embodiment can be here omitted, which can help reduced memory requirement for storage of the lookup table data structure.

Data Item Segmented Value Reading Module 210

The data item segmented value reading module 210 is capable of reading the input data item (i.e., IP address 30) for the values of the partitioned segments of the IP address 30 for use by the inquiry module 220 as a set of lookup keys for inquiring the multi-stage lookup table module 100 to find the corresponding interval identifier.

In the first embodiment of FIG. 4A, for example, the data format of the 32-bit IP address 30 is partitioned into 3 segments: a 16-bit prefix segment 31, an 8-bit middle segment 32, and an 8-bit postfix segment 33. Therefore, the data item segmented value reading module 210 will read the respective values of these three segments 31, 32, 33 for use as 3 lookup keys.

For the second embodiment of FIG. 4B, however, the data item segmented value reading module 210 will read the value of the 16-bit prefix segment 31 as a first lookup key for the first stage inquiry, the value of the 8-bit middle segment 32 as a second lookup key for the second stage inquiry, and the value of the whole 32-bit data of the incoming IP address 30 as a third lookup key for the third stage inquiry.

Inquiry Module 220

The inquiry module 220 is capable of using the lookup keys furnished by the data item segmented value reading module 210 for inquiring the multi-stage lookup table module 100 to find the corresponding interval identifier of the IP address 30. In the first embodiment, the inquiry module 220 will perform an inquiry process on the lookup tables 110, 120a, 120b, 130; whereas in the second embodiment, the inquiry module 220 will perform an inquiry process on the lookup tables 110, 120, 140.

In the case of the first embodiment of FIG. 4A, assume the IP address 30 has a value [1888 8888], then the data item segmented value reading module 210 will read the IP address 30 and thereby provide the following 3 lookup keys: {[1888], [88], [88]}. The inquiry module 220 will then use the first lookup key [1888] for inquiring the first-stage lookup table 110, with the result being [5]. Since this result is an interval identifier, the inquiry process is completed and the interval identifier [5] is outputted as the end result 40. Furthermore, assume the IP address 30 has a value [1234 5600], then the data item segmented value reading module 210 will read the IP address 30 and thereby provide the following 3 lookup keys: {[1234], [56], [00]}. In the first step, the inquiry module 220 will use the first lookup key [1234] for inquiring the first-stage lookup table 110, with the result being a link to the second-stage first-level lookup table 120a. Therefore, in the second step, the inquiry module 220 will use the second lookup key [56] for inquiring the second-stage first-level lookup table 120a, with the result being a link to the third-stage lookup table 130. Therefore, in the third step, the inquiry module 220 will use the third lookup key [00] for inquiring the third-stage lookup table 130, with the result being [1]. Since this result is an interval identifier, the inquiry process is completed and the interval identifier [1] is outputted as the end result 40.

In the case of the second embodiment of FIG. 4B, assume the IP address 30 has a value [1234 5688], then the data item segmented value reading module 210 will read the IP address 30 to thereby provide the following 3 lookup keys: {[1234], [56], [88]}. In the first step, the inquiry module 220 will use the first lookup key [1234] for inquiring the first-stage lookup table 110, with the result being a link to the second-stage lookup table 120. Therefore, in the second step, the inquiry module 220 will use the second lookup key [56] for inquiring the second-stage lookup table 120, with the result being a link to the interval identifier lookup table 140. Therefore, in the third step, the inquiry module 220 will use the entire 32-bit data [1234 5688] for inquiring the interval identifier lookup table 140, with the result being [3]. Then, the inquiry process is completed and the interval identifier [3] is outputted as the end result 40.

Operation of the Invention

The following is a detailed description of practical application examples of the data item interval identifier lookup system of the invention 50 during actual operation. In this application example, it is assumed that the input data item is a 32-bit IP address 30 whose data format is partitioned into 3 segments: 16-bit prefix segment 31, 8-bit middle segment 32, and 8-bit postfix segment 33.

Operation of the First Embodiment

In this application example, the multi-stage lookup table module 100 is implemented with the first embodiment shown in FIG. 4A. In this case, when the data item interval identifier lookup system of the invention 50 receives an IP address 30, the data item segmented value reading module 210 will be first activated to read the value of the 16-bit prefix segment 31 of the IP address 30 for use as a first lookup key by the inquiry module 220 to inquire the first-stage lookup table 110.

If the inquiry result is an identifier specifier 111, the inquiry process is completed, and the set value of the identifier specifier 111 is outputted as the end result 40. On the other hand, if the inquiry result is a link specifier 112, which specifies a link to a second-stage lookup table (i.e., the second-stage first-level lookup table 120a or the second-stage second-level lookup table 120b), the data item segmented value reading module 210 will then read the 8-bit middle segment 32 of the IP address 30 and use its value as a second lookup key for the inquiry module 220 to inquire the linked lookup table in the second stage (i.e., the second-stage first-level lookup table 120a or the second-stage second-level lookup table 120b). If the inquiry result is an identifier specifier 121, the inquiry process is completed and the set value of the identifier specifier 121 is outputted as the end result 40. On the other hand, if the inquiry result is a link specifier 122, which specifies a link to a third-stage lookup table (i.e., the third-stage lookup table 130), the data item segmented value reading module 210 then reads the 8-bit postfix segment 33 of the IP address 30 and uses its value as a third lookup key for the inquiry module 220 to inquire the third-stage lookup table 130. The inquiry result from the third-stage lookup table 130 is then outputted as the end result 40.

Operation of the Second Embodiment

In this application example, the multi-stage lookup table module 100 is implemented with the second embodiment shown in FIG. 4B. In this case, when the data item interval identifier lookup system of the invention 50 receives an IP address 30, the data item segmented value reading module 210 will be first activated to read the value of the 16-bit prefix segment 31 of the IP address 30 for use as a first lookup key by the inquiry module 220 to inquire the first-stage lookup table 110.

If the inquiry result is an identifier specifier 111 or a link specifier 112, the operational action is the same as the first embodiment described above, so description thereof will not be repeated here.

On the other hand, if the inquiry result is an identifier-range and link specifier 113, then the inquiry module 220 will read the set value (in the example of FIG. 4B, the set value is [5–3] which indicates that the interval identifier is [5], or [6], or [7] (i.e., [5] denotes the bottom bound of the possible identifier range and [3] denotes the total number of possible interval identifiers in this range). Next, the data item segmented value reading module 210 reads the whole 32-bit data of the IP address 30 and uses its value as a lookup key for the inquiry module 220 to inquire the interval identifier lookup table 140 in reference to the possible interval identifiers [5], [6], and [7]. The inquiry result from the interval identifier lookup table 140 is then outputted as the end result 40.

CONCLUSION

In conclusion, the invention provides a data item interval identifier lookup method and system which is characterized by the use of a multi-stage lookup-table data structure having a number of cascaded lookup tables constructed by partitioning the data format of the input data item into a number of segments, each being mapped to one stage of lookup table data structure whose key-value relationships are predefined based on a predefined interval-and-identifier definition table. In operation, the values of the partitioned segments are sequentially used as lookup keys to search through the multi-stage lookup-table data structure until the corresponding interval identifier is found. This feature allows the implementation to have low memory requirement and enhanced system performance. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A data item interval identifier lookup method for use on a data processing system for performing an interval identifier lookup function for an input data item; wherein the entire value range of the input data item is predefined into a series of consecutive intervals each assigned to a unique identifier, and wherein the interval identifier lookup function is used to find a corresponding identifier for the input data item;

the data item interval identifier lookup method comprising:
building a multi-stage lookup table module, which includes a plurality of cascaded stages of lookup table data structures, which are established by firstly partitioning the entire value range of the input data item into a number of segments, and secondly building a mapping relation for each lookup table data structure based on a predefined interval-and-identifier definition table in reference to the partitioned segments of the input data item, wherein each of the lookup table data structure comprises a mapped item including an identifier-range and link specifier used for specifying both a corresponding identifier range and a link to -a single interval identifier lookup table, wherein the single interval identifier lookup table corresponds to the predefined interval-and-identifier definition table;
during actual operation, reading the input data item for the value of each of the partitioned segments of the input data item for use as a set of lookup keys, wherein one of the lookup keys is the entire value of the input data item; and
using the lookup keys to inquire the multi-stage lookup table module to find a corresponding interval identifier for the input data item.

2. The data item interval identifier lookup method of claim 1, wherein input data item is an IP (Internet Protocol) address.

3. The data item interval identifier lookup method of claim 1, wherein the input data item is a memory address.

4. The data item interval identifier lookup method of claim 1, wherein the input data item is a hard disk address.

5. The data item interval identifier lookup method of claim 1, wherein the identifier-range and link specifier defines an identifier range by specifying a bottom bound and an upper bound for the identifier range.

6. The data item interval identifier lookup method of claim 1, wherein the identifier-range and link specifier defines an identifier range by specifying a bottom bound for the identifier range and a total number of interval identifiers within the identifier range counting forward from the bottom bound.

7. The data item interval identifier lookup method of claim 1, wherein the identifier-range and link specifier defines an identifier range by specifying an upper bound for the identifier range and a total number of interval identifiers within the identifier range counting backward from the upper bound.

8. The data item interval identifier lookup method of claim 1, wherein the corresponding identifier range is consecutive.

9. The data item interval identifier lookup method of claim 1, wherein the single interval identifier lookup table specifies the starting value of each of the consecutive intervals and lastly specifies the uppermost ending value of all of the consecutive intervals.

10. A non-transitory computer-readable storage medium which stores instructions which, when executed by a computer, enables a data item interval identifier lookup system to
    firstly partition an entire value range of an input data item into a number of segments, and secondly build a mapping relation for each of a plurality of cascaded-stages of lookup table data structures based on a predefined interval-and-identifier definition table in reference to the partitioned segments of the input data item, wherein each of the lookup table data structures comprises a mapped item including an identifier-range and link specifier used for specifying both a corresponding identifier range and a link to a single interval identifier lookup table, and the single interval identifier lookup table corresponds to the predefined interval-and-identifier definition table;
    read the input data item for the value of each of the partitioned segments of the input data item for use as a set of lookup keys, wherein one of the lookup keys is the entire value of the input data item; and
    use the lookup keys to find a corresponding interval identifier for the input data item.

11. The non-transitory computer-readable storage medium of claim 10, wherein the input data item is an IP (Internet Protocol) address.

12. The non-transitory computer-readable storage medium of claim 10, wherein the input data item is a memory address.

13. The non-transitory computer-readable storage medium of claim 10, wherein the input data item is a hard disk address.

14. The non-transitory computer-readable storage medium of claim 10, wherein the identifier-range and link specifier defines an identifier range by specifying a bottom bound and an upper bound for the identifier range.

15. The non-transitory computer-readable storage medium of claim 10, wherein the identifier-range and link specifier defines an identifier range by specifying a bottom bound for the identifier range and a total number of interval identifiers within the identifier range counting forward from the bottom bound.

16. The non-transitory computer-readable storage medium of claim 10, wherein the identifier-range and link specifier defines an identifier range by specifying an upper bound for the identifier range and a total number of interval identifiers within the identifier range counting backward from the upper bound.

17. The non-transitory computer-readable storage medium of claim 10, wherein the interval identifier lookup table is implemented with a binary search method for inquiry.

18. The non-transitory computer-readable storage medium of claim 10, wherein the corresponding identifier range is consecutive.

19. The non-transitory computer-readable storage medium of claim 10, wherein the single interval identifier lookup table specifies the starting value of each of the consecutive intervals and lastly specifies the uppermost ending value of all of the consecutive intervals.

* * * * *